Dec. 31, 1957   J R. WRIGHT ET AL   2,817,966
ENGINE POWER INDICATOR
Filed March 16, 1953   3 Sheets-Sheet 1

INVENTORS
J. RONDLE WRIGHT &
MYRL A. LINDEMAN
BY
Busser, Smith & Harding
ATTORNEYS

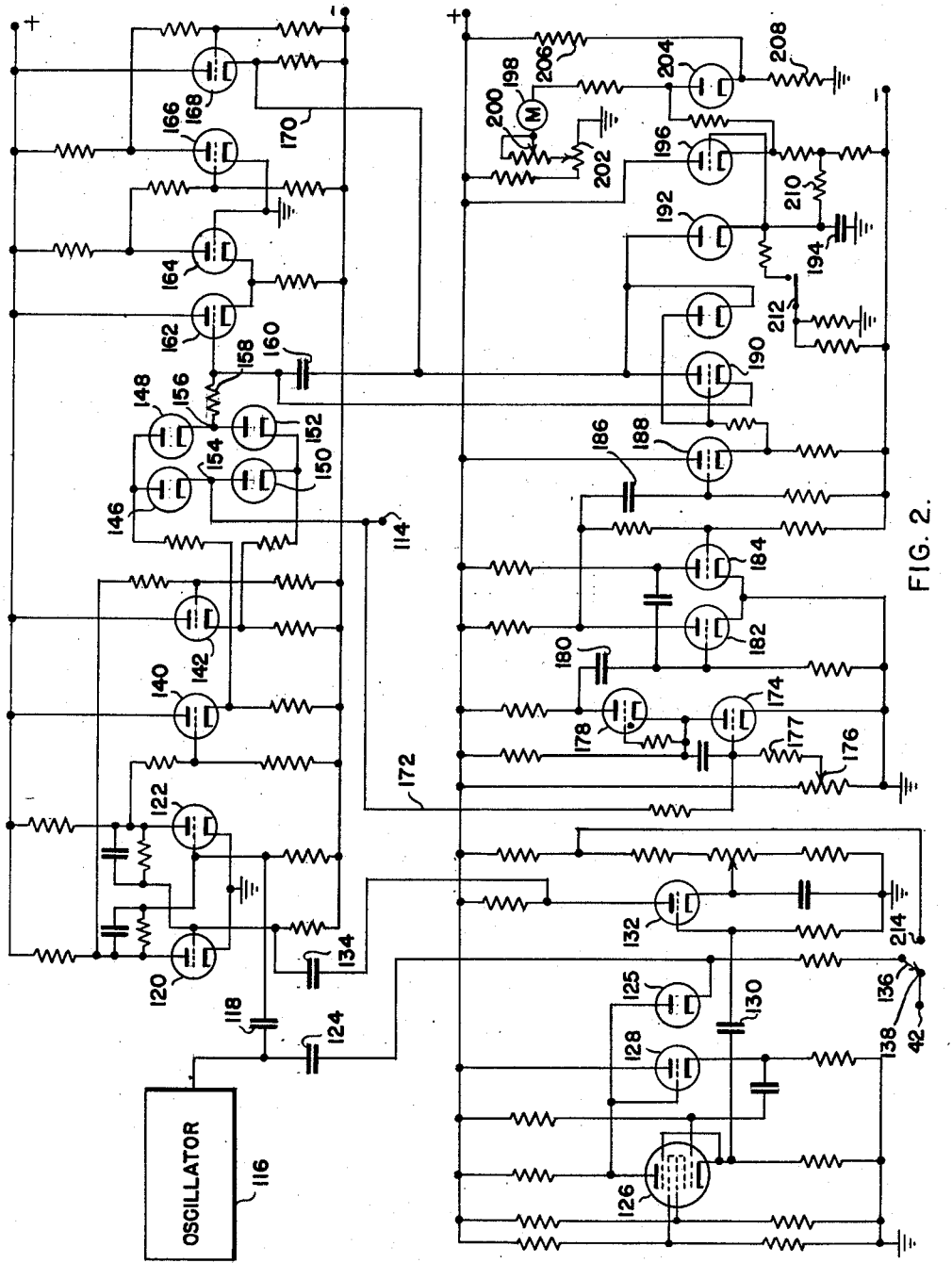

United States Patent Office 2,817,966
Patented Dec. 31, 1957

2,817,966

ENGINE POWER INDICATOR

J Rondle Wright, Newtown Square, and Myrl A. Lindeman, Media, Pa., assignors to Sun Oil Company, Philadelphia, Pa., a corporation of New Jersey Application March 16, 1953, Serial No. 342,494

1 Claim. (Cl. 73—116)

This invention relates to an engine power indicator and has particular reference to an indicator giving substantially instantaneously the power generated in a single engine cylinder.

To determine performance of an engine, for example an internal combustion engine, in order to ascertain the adjustments which may be necessary for best performance it is desirable to be able to determine substantially instantaneously the power developed in each cylinder. The usual PV diagram requires the use of a planimeter to translate its area into determination of power and this entails substantial delay. A PV diagram exhibited on an oscilloscope has the same drawback. In accordance with the present invention the work done or power developed in a single cycle may be instantaneously ascertained and, consequently, necessary adjustments may be made without delay and with immediate check on the effects of the adjustments.

In brief, the apparatus provided in accordance with the invention has electrical inputs corresponding to the pressure and volume. The product of these inputs is integrated in an approximate fashion which, however, despite the fact that it is approximate, is quite accurate. The approximate integration is performed by adding pulses. The amplitude of each pulse is proportional to the first derivative of the volume displacement of the cylinder undergoing test with respect to time. The duration of each pulse is proportional to the pressure. In accordance with one embodiment of the invention, the pulses are developed at a fixed frequency. The summation of the pulses then gives a measure of the power developed at a particular engine speed, and may be translated into power developed at the actual speed by multiplying by the ratio of the actual speed to the assumed speed. In accordance with a modification of the invention, the pulses already described are generated so that a fixed number of them occurs in each cycle. The resulting summation is then a measure of the actual power developed.

The general object of the present invention is the provision of an engine indicator of the type just discussed. This general object as well as subsidiary objects relating to details of construction and operation will become apparent from the following description read in conjunction with the accompanying drawings, in which:

Figure 2 is a wiring diagram showing, in particular, the parts of the apparatus having to do with the generation and summation of pulses;

As will become evident hereafter, the apparatus is adapted for the determination of power developed by various types of displacement engines including steam engines and internal combustion engines of both spark ignition and diesel types. For the sake of uniformity of description there will be considered an apparatus having characteristics suitable for the determination of the power developed in diesel marine engines of relatively low speed, operating, for example, at approximately 100 R. P. M. It will, however, be apparent that the apparatus may be readily modified to measure power developed in high speed engines, there being then required for accuracy merely the provision for production of pulses at a higher frequency rate.

Figures 1, 4:
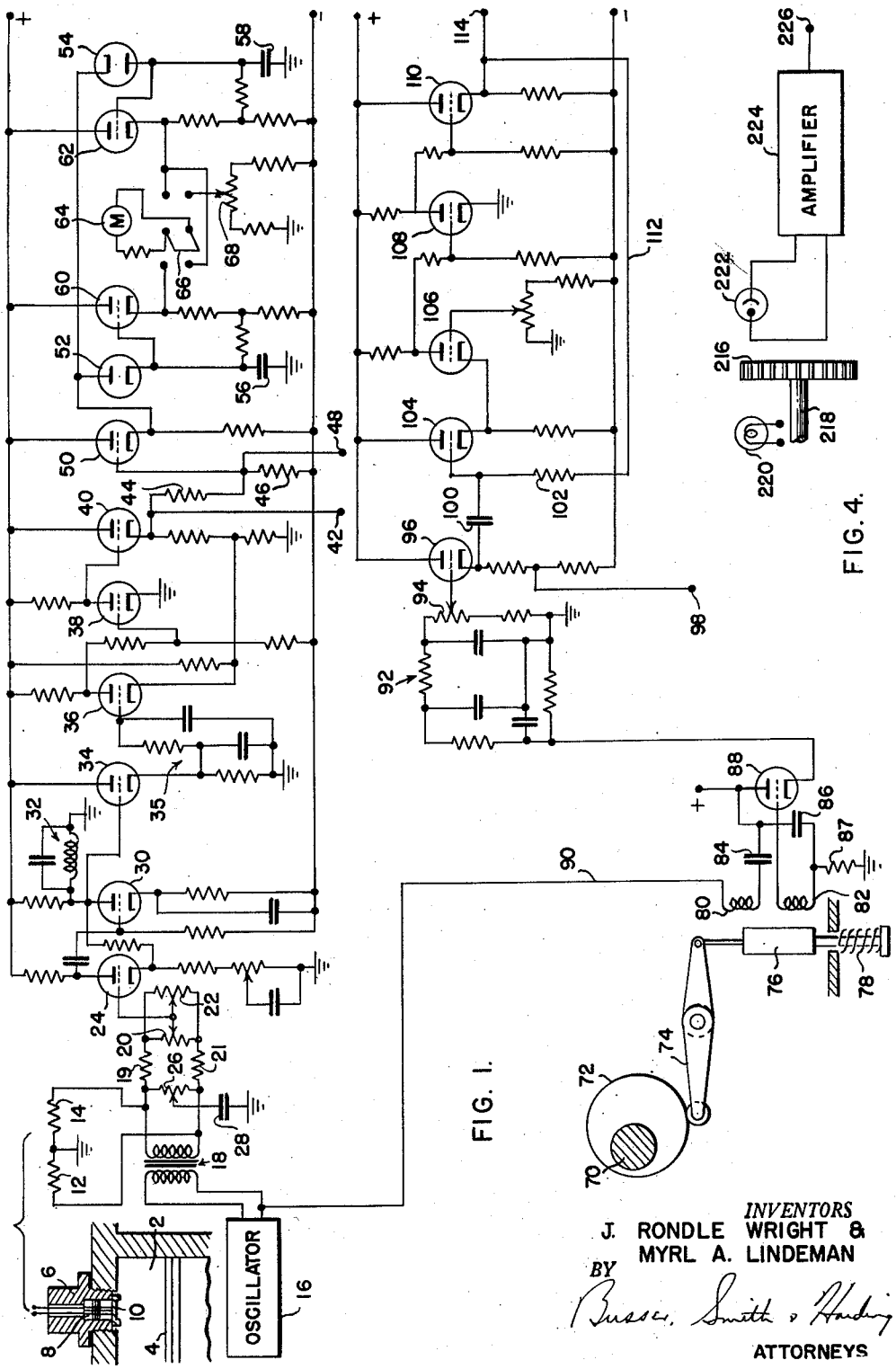
Figure 1 is a wiring diagram showing additionally certain mechanical elements in diagrammatic form and arranged to give rise to output potentials proportional to instantaneous cylinder pressure, instantaneous cylinder volume, and instantaneous values of the first derivative of the volume with respect to time.
Figure 4 is a diagram showing a modification of what is illustrated in Figure 2 provided to achieve a direct indication of power developed at any speed.

Referring to Figure 1 there is indicated at 2 a cylinder of an internal combustion engine in which reciprocates the piston 4. Carried by a plug 6 in the cylinder head there is a strain gauge 8 which is provided with a pair of windings, one on the circumference of a hollow cylinder and the other wound longitudinally. The outer end of the cylinder is fixed in the plug 6 and the other end is connected to a diaphragm 10 exposed to the pressure within the combustion chamber of the cylinder. The spring constant of the diaphragm is small compared with that of the cylinder so that the cylinder supports the applied pressure transmitted through the diaphragm. When pressure is applied, the length of the cylinder decreases and its diameter increases so that as a result the resistance of one element increases while that of the other decreases. The two resistance elements of the strain gauge are diagrammed at 12 and 14 and are connected to opposite legs of a Wheatstone bridge which is excited by the oscillator 16 through the transformer 18. The remaining elements of the bridge are constituted by the resistances 19 and 21 between which are connected the potentiometers 20 and 22, respectively, for course and fine adjustment of the bridge. The output of the bridge is fed between ground and the grid of a triode 24 which constitutes the first element of an amplifier. For quadrature balance of the bridge there is provided the potentiometer 26, the adjustable contact of which is connected through condenser 28 to ground.

The triode 24 and a second triode 30 are arranged as a two stage alternating current amplifier which is tuned to the frequency of the oscillator by the circuit 32. The frequency of the oscillator may be, for example, 3000 cycles per second though this figure is by no means critical. The output from triode 30 is rectified at the cathode follower 34 and is filtered to remove alternating components by the network indicated at 35. The filter then feeds a D. C. amplifier comprising the triodes 36, 38 and 40 with conventional connections, the triode 40 being in a cathode follower arrangement and delivering its output to the terminal 42. The alternating current gain and the zero control adjustments may be so set as to give, for example, at terminal 42 an output of 60 and 160 volts for applied pressures of zero and 500 pounds per square inch. The arrangement illustrated is quite accurately linear so that the potential appearing at terminal 42 is linearly related to the pressure in the cylinder.

The output from the cathode follower is also delivered to the potential divider comprising the resistances 44 and 46, from the junction of which there is a connection to an additional terminal 48. The junction is also connected to the grid of a triode 50 which is arranged in a cathode follower circuit having its output delivered to a peak pressure voltmeter comprising the diodes 52 and 54 and the cathode followers 50 and 62. It will be noted that the cathode follower comprising the triode 50 is returned to a negative potential supply line. The cathode of diode 52 is connected through condenser 56 to ground while the anode of diode 54 is connected through a condenser 58 to ground. The ungrounded sides of the condensers accordingly accumulate positive and negative potentials, respectively, which correspond to maximum and minimum pressures. The cathode followers driven by these potentials supply corresponding potentials across which the meter 64 is connected when the double-pole double-throw switch 66 is in its left hand position. The meter accordingly indicates the difference in maximum and minimum pressures. With this arrangement the peak pressure indication is not changed by drift in the pressure transmitter and amplifier so long as there is no drift out of the operating range. The peak indicating meter 64 may also be connected between the minimum peak potential, appearing at the cathode of triode 62, and ground when the switch 66 is thrown to its right hand position. In this fashion the minimum pressure level can be checked and reset at any time, adjustment being made at the movable contacts of potentiometers 20 and 22. Potentiometer 68 is provided for setting the circuit so that zero pressure on the pickup makes the meter indicate zero pressure when switch 66 is thrown to its right hand position.

The crank shaft of the engine indicated at 70 is provided with a cam 72 which may be the usual cam provided for making indicator card measurements. This cam drives the lever arrangement indicated at 74 and, through it, a laminated core indicated at 76 and urged downwardly as viewed in Figure 1 by a spring 78. Surrounding this core 76 are coils 80 and 82 which are interconnected, as illustrated, with condensers 84 and 86 and are connected to ground through resistance 87. Excitation is effected from oscillator 16 through the connection 90. The output from the coil arrangement is delivered to the triode 88 which is in a cathode follower arrangement with a filter network 92. This arrangement is such that rectification of the signal appearing at the grid of triode 88 takes place and the high frequency components are filtered out so that there is delivered through the movable contact of potentiometer 94 a signal which has a potential linearly proportional to the volume of the cylinder above the piston. A corresponding signal is delivered from the cathode follower 96 to the terminal 98.

The volume signal appearing at the cathode of triode 96 is differentiated by the conventional feedback-type differentiating circuit comprising the condenser 100 and resistance 102 and the triodes 104, 106, 108 and 110, the feedback being from the cathode of the last mentioned triode through line 112 to the resistance 102. A differentiated signal then appears at terminal 114 connected to the cathode of triode 110, the differentiated signal corresponding to the first time derivative of the volume.

The signals appearing at terminals 48 and 98 corresponding to pressure and volume, respecetively, may be fed to an oscilloscope for visual presentation of a conventional PV diagram. The signals from the terminals 42 and 114 are fed to an integrating arrangement which will now be described with reference to Figure 2.

An oscillator is provided at 116 and desirably takes the form of a free running multivibrator of conventional type associated with a diode and conventional cathode follower output. This oscillator delivers negative trigger voltages at a frequency which may be of the order of 200 cycles per second in the case of a marine diesel engine operating in the general vicinity of 100 R. P. M. In the case of an engine having a higher speed it is desirable that this ocillator should provide negative trigger voltages at a corresponding higher frequency. The trigger voltages are delivered through condenser 118 to a conventional bistable multivibrator of the Eccles-Jordan type comprising the triodes 120 and 122. The negative trigger voltages are also delivered through a condenser 124 and a diode 125 to the conventional phantastron circuit comprising the pentagrid converter 126 and triode 128 in a conventional arrangement. The negative trigger introduced through condenser 124 starts the "rundown" of the phantastron circuit, and when the rundown terminates the phantastron quickly reverts to its original state and, in doing so, delivers a negative trigger through condenser 134 to the bistable multivibrator from the anode of amplifying triode 132, the grid of which is connected to the phantastron through condenser 130. The rundown time of the phantastron is determined by the pressure signal appearing at terminal 42 and applied through the left-hand contact 138 of switch 136 to the cathode of the diode 125. The rundown time is accurately linearly proportional to the potential at the terminal 42.

The action of the circuit so far described is as follows:
A negative trigger applied through condenser 118 to the bistable multivibrator will flip it into one of its stable positions. This same trigger starts the rundown of the phantastron, and at the end of the rundown a negative trigger applied to the bistable multivibrator through condenser 134 flips it back to its original state. The period in which the bistable multivibrator is in its state following reception of the initial trigger is accordingly accurately proportional to the pressure signal at terminal 42.

The anodes of triodes 122 and 120 are respectively connected to the grids of the triodes 140 and 142 in cathode follower arrangements, and the signals from the cathodes of these triodes are delivered to the electronic switch which comprises the diode pairs consisting of the diodes 146, 148, 150 and 152, arranged as illustrated with the cathode of diode 146 connected at 154 to the anode of diode 150, and with the cathode of diode 148 connected at 156 to the anode of diode 152. When the cathodes of diodes 150 and 152 are positive, and the anodes of diodes 146 and 148 are negative, current will not flow through the diodes and, accordingly, the connections 154 and 156 are electrically isolated from each other. On the other hand, when the anodes of diodes 146 and 148 are positive, and the cathodes of diodes 150 and 152 are negative, the diodes are highly conductive and the arrangement is such as to effectively connect directly the connections 154 and 156. Connection 154 is joined to the differentiated volume signal terminal 114, and accordingly when the switch is "closed" the terminal 114 is effectively connected to the connection 156. The output from connection 156 is fed through resistance 158 to condenser 160, the resistance and condenser forming part of a feedback type integrator comprising the triodes 162, 164, 166 and 168 in a conventional arrangement, with the feedback from the cathode of triode 168 taking place through connection 170 to the lower terminal of condenser 160. The feedback amplifier has a high gain and approximates perfect integration.

The arrangement is such that when the switch is "closed" an increment of charge is fed from terminal 114 to the condenser 160. This increment of charge is effected by the potential appearing at terminal 114 and flow of current takes place through a period which is proportional to the potential appearing at the pressure signal terminal 42. Accordingly, the increment of charge to the integrating condenser is proportional to the product of the pressure by the first time derivative of the volume.

The summation of these increments of charge gives a measure of the power developed and integration must be effected over a complete cycle of the engine. Assuming a two stroke engine, the integration thus corresponds to a single revolution of the shaft 70. In the case of a four stroke engine, of course, the integration would take place over the period of two revolutions of the crank shaft.

Considering for consistency a two stroke engine, the limitation of the integration to each complete cycle is effected as follows:

The terminal 114 is connected at 172 to the grid of a triode 174 which is arranged in an amplifying and clipping circuit. A reset time adjustment is afforded through the connection of the grid of triode 174 to the adjustable contact of a potentiometer 176 through a resistance 177, the potentiometer having the contact 176 being connected to provide an adjustable positive potential point by connection between the positive potential supply line and ground. When the differentiated volume signal passes through a zero value in a positive direction, a thyratron 178 is fired to deliver through condenser 180 a negative trigger pulse to the monostable multivibrator circuit of conventional type comprising the triodes 182 and 184. The negative pulse thus supplied flips the monostable multivibrator to its astable state for a period which may, for example, be about five milliseconds, during which a positive pulse is delivered through condenser 186 to the grid of the triode 188 arranged in a cathode follower circuit. The cathode of triode 188 is connected to the grid of a triode 190. As will be noted from the diagram, the anode and cathode of this triode 190 are connected across the condenser 160, and when a positive pulse is delivered to the grid of triode 190 it becomes highly conductive to effect discharge of the condenser 160. Thus, once in each cycle, the condenser is discharged to an initial state so as to be prepared to receive another set of pulses from terminal 114. If the apparatus was to be used with a four stroke engine, it will be obvious that a scale-of-two circuit could be interposed between the condenser 180 and the monostable multivibrator circuit so that the condenser discharging pulse would occur only once for every two cycles of shaft 70.

The positive potential which accumulates at the lower terminal of condenser 160 is applied through diode 192 to the ungrounded side of condenser 194 which is connected through a high resistance 210 to a network running to the negative potential supply line. Resetting of the potential of condenser 194 may be manually effected through switch 212 connected to a fixed negative potential of a resistance network connected between ground and the negative potential supply line. The cathode of diode 192 is connected to the grid of triode 196 in a cathode follower arrangement. To the cathode of this triode there is connected through resistances one terminal of a meter 198 which is connected to ground through a pair of potentiometers having contacts at 200 and 202. As will appear, the contact 200 is adjustable for correspondence with engine speeds, while the contact at 202 constitutes a zero adjustment for the meter. A diode 204 connected to the meter circuit provides protection against excessive potentials by connection of its cathode to a point of fixed positive potential afforded by the junction of resistances 206 and 208 which are connected between the positive potential supply line and ground.

The terminal 214 which is alternatively engaged by switch 136 serves for gating signal adjustment.

Figure 3:
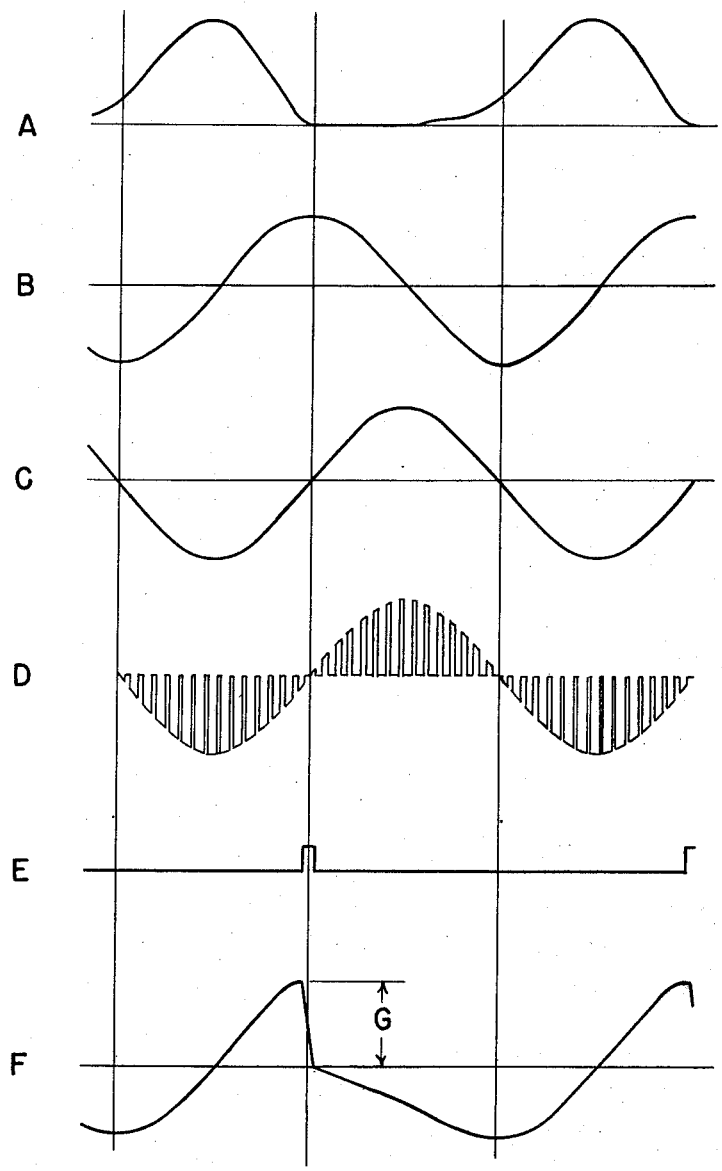
Figure 3 is a curve diagram explanatory of the operation.

The overall operation of the circuits described may be understood with reference to Figure 3 which shows in diagrammatic form curves representing various signals.

At A there is illustrated a typical pressure signal such as will result in the operation of a two cycle slow speed diesel engine. At B there is illustrated the variation of cylinder volume. The curve C illustrates the first time derivative of the volume signal. D indicates the pulses of variable width and amplitude which are fed to the integrator, there being indicated, for clarity, a number of pulses less than the number actually occurring. The curve at E represents the reset pulse which has been described as of about five milliseconds duration. The curve at F indicates the result of the integrator in providing a potential at the lower terminal of condenser 160. The peak value of this potential at the beginning of the condenser discharge is indicated at G.

As will be evident from the foregoing discussion, the switching arrangement of the diodes 146, 148, 150 and 152 is "closed" for periods of duration proportional to the instantaneous magnitude of the pressure signal represented by the curve A. The input to the switching arrangement consists of signals proportional to the first time derivative of the volume signal represented at C. The pulses at D are provided at the frequency of the oscillator 116.

It will be evident that the integration of the pulses taken with due regard to sign over a single cycle will constitute a measure of the integral of pressure multiplied by the first time derivative of volume with respect to time. At a given speed of operation, i. e. a given periodicity of the cycle of operation of the engine, the resulting summation, approximating the integral will be a measure of the power delivered by the cylinder from which the pressure signals originate.

From the description of the circuitry, it will be evident that the potential at the lower side of condenser 160 becomes, in each cycle, a measure of the summation. The condenser at the end of each cycle is discharged, but its peak potential is transferred through diode 192 to the condenser 194. Condenser 194 has a potential waveform which rises substantially to the peak value of the potential at the lower side of condenser 160 prior to the beginning of discharge of condenser 160, then drops slowly as determined by the values of condenser 194, resistor 210 and the associated cathode follower network, and then again rises as the potential applied through diode 192 exceeds the potential to which the condenser has dropped. The potential drop during each cycle in slow speed operation may be, for example, 5% of maximum potential, and the needle of the meter may correspondingly fluctuate so that its maximum reading should be used. It may be noted that if the power decreases too rapidly, there may intervene several cycles following initiation of the charge before the meter readings become valid. The result is to give a measure of the power output of the engine substantially instantaneously and, normally, for individual cycles so long as the engine is operating at constant speed.

Validity of the results, however, depend upon constancy of speed of the engine at the particular speed for which the apparatus is calibrated. If the engine is operating at a different speed, the apparent power output must be multiplied by the ratio of the actual speed to the speed for which calibration was made. This is, of course, merely a matter of computed correction but for small ranges of speed, such as would occur in the case of a marine diesel engine, it is sufficiently accurate to provide the variable resistance at 200 and calibrate it in terms of speed. By adjustment of the variable contact at 200 to the actual speed, therefore, a quite accurate measurement of power output may be directly made.

The advantage of the apparatus from the standpoint of engine power measurement is the possibility of making adjustments and noting substantially instantaneously the results of the adjustments. By providing pressure output elements such as 8 in each of the cylinders of a multi-cylinder engine, and providing a multiple step switch, the various cylinders of the engine may be switched instantaneously into the circuit and measurements made of the entire set of cylinders in a very short time. Thus, relative adjustments of their operations can be effected.

In the specific description above provision has been made for summation, for approximate integration, over single cycles. To do this the condenser 160 is discharged once for every cycle. It will be evident that the discharge could be made to occur at the end of any integral number of periods of the engine operation and it is to be understood that when an integral number of periods is referred to herein, that expression includes a single period as well as multiples thereof.

Mention has just been made of the fact that the results given are valid, without computed correction, only for operation at a particular frequency of the periods involved, i. e. specifically, for constant speed of the engine. The apparatus may, if desired, particularly where great variations in speed are encountered, be made to indicate directly and accurately for any speed if the frequency of the pulses entering the circuit of Figure 2 from the oscillator is made proportional to the engine speed. Figure 4 indicates a simple arrangement whereby this may be accomplished. 216 is a toothed wheel carried by a shaft 218 which may be the engine shaft or a shaft geared thereto. A lamp 220 illuminates a photocell 222 through the teeth of 216 and the output of this photocell may be amplified by an amplifier 224 to provide at 226 an alternating output having a frequency proportional to the speed of the engine. This output may then be fed through condensers 118 and 124 in Figure 2 and the result will be to secure on the meter 198 indications which are direct and accurate measurements of the power output at any speed.

While the invention has been particularly described with reference to the determination of the power output of engines, it will be evident that the apparatus is of considerably broader utility and, therefore, the invention is not to be regarded as limited to the measurement of power output of engines. Fundamentally, the apparatus is designed to secure by summation the approximate integration of the product of two periodic variables having the same frequency, the integration being taken over individual cycles, or integral groups of cycles, with measurements made, if desired and as described, as averages for a number of successive cycles. As has been specifically described, one of the variables involved may be the first time derivative of another variable, though that is not necessarily the case. In fact, it may be pointed out that instead of integrating the product of the pressure in an engine cylinder by the first time derivative of the volume with respect to time, the integration could as well have been made with interchange of the input signals to comprise the integration of the product of the volume with the first time derivative of the pressure, the integration being with respect to time. It will, accordingly, be evident that the invention is of quite broad applicability and is not to be considered as limited except as required by the following claim.

What is claimed is:

Apparatus for indicating power in a cyclically operating displacement type engine comprising means producing a periodic signal proportional to the pressure in a chamber of such engine, means for producing a periodic signal proportional to the volume of said chamber, means receiving the signal from one of said first mentioned means providing a signal corresponding to the first time derivative of said one of said two signals, means responsive to the speed of operation of the engine and receiving both the signal from said last mentioned means and the signal from the other of said first mentioned means providing a series of pulses at a frequency proportional to the speed of operation of the engine and greatly in excess of the frequency of said periodic signals, each pulse having an amplitude substantially proportional to the amplitude of one of the signals received by the last mentioned means at the time of formation of the pulse and having a duration substantially proportional to the amplitude of the other of the signals received by the last mentioned means at the time of formation of the pulse, and means receiving pulses from the last mentioned means and repeatedly summing the values of pulses of said series over the duration of a time period having its initiation and termination at the same phase of the engine cycle.

References Cited in the file of this patent

UNITED STATES PATENTS

| | | |
|---|---|---|
| 1,159,769 | Hollstein | Nov. 9, 1915 |
| 2,067,262 | De Montvignier et al. | Jan. 12, 1937 |
| 2,349,560 | Reijnst | May 23, 1944 |
| 2,535,061 | Grieg | Dec. 26, 1950 |
| 2,595,425 | Thomson et al. | May 6, 1952 |
| 2,637,204 | Short | May 5, 1953 |
| 2,725,191 | Ham | Nov. 29, 1955 |

FOREIGN PATENTS

| | | |
|---|---|---|
| 571,003 | Great Britain | Aug. 1, 1945 |

OTHER REFERENCES

Text-Waveform (MIT Series, vol. 19), Chance et al., page 674.